Feb. 5, 1935.  C. H. HELDENBRAND ET AL  1,989,690
APPARATUS FOR LOOPING SHEET MATERIAL
Filed Sept. 12, 1932  7 Sheets-Sheet 1

Inventors
Carl H. Heldenbrand
Urban C. Haren
Frank Slusher
By Eakin & Avery
Attys Feb. 5, 1935. C. H. HELDENBRAND ET AL 1,989,690
APPARATUS FOR LOOPING SHEET MATERIAL
Filed Sept. 12, 1932    7 Sheets-Sheet 6

Inventors
Carl H. Heldenbrand
Urban C. Haren
Frank Slusher
By Eakin & Avery Attys.

Patented Feb. 5, 1935

1,989,690

UNITED STATES PATENT OFFICE 1,989,690

APPARATUS FOR LOOPING SHEET MATERIAL

Carl H. Heldenbrand, Urban C. Haren, and Frank Slusher, Akron, Ohio, assignors to The B. F. Goodrich Company, New York, N. Y., a corporation of New York Application September 12, 1932, Serial No. 632,700

25 Claims. (Cl. 154—30)

This invention relates to apparatus for looping sheet material sinuously upon itself, and is especially useful in the manufacture of cushioning bodies comprising resilient sheet material held in looped or cellular form, for example as is disclosed in the copending application of Carl H. Heldenbrand, Serial No. 557,810, filed August 17, 1931, for Cushioning bodies and method of producing the same.

Objects of this invention are to provide apparatus for sinuously looping the sheet material and preferably also pressing the walls of adjacent loops into adhesive engagement, and to provide for effective and noninjurious mechanical manipulation of the sheet material even though it be in a comparatively weak condition, as in the case where the sheet is composed of unwoven fibers held in a reticulated or web form solely by a flexible agglutinant, such as unvulcanized rubber composition, and the sheet is to be looped before complete drying or vulcanization thereof. Further objects are to provide for rapidity of operation, and dimensional accuracy and uniform high quality of the product.

These and further objects will be apparent from the following description, reference being had to the accompanying drawings, in which:

Figs. 1a and 1b taken together constitute a front elevation of apparatus constructed according to and embodying the invention in its preferred form.

Fig. 2 is an end elevation of the apparatus, as seen from the left in Fig. 1a.

Fig. 4 is an enlarged section taken along the line 4—4 of Fig. 1a.

Figure 1A:
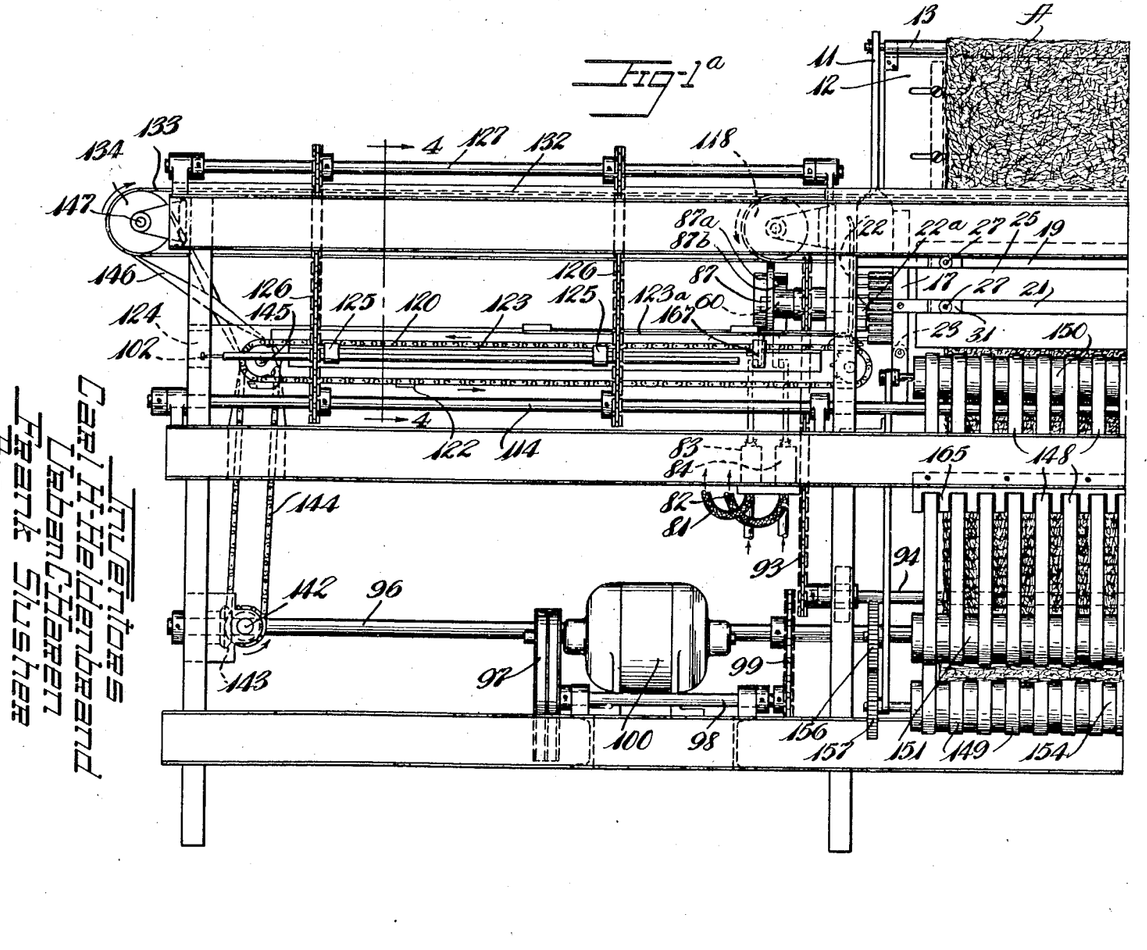

The apparatus in general comprises mechanism, located at the central portion of the apparatus, for pressing a plurality of loop-forming rods consecutively against the sheet material and in alternation at the opposite faces of the sheet to distort the sheet sinuously about the rods and to press the walls of adjacent loops into adhesive engagement; and mechanism for consecutively extracting the rods in pairs in opposite directions from the looped sheet and returning them for a new cycle of loop-forming, this extracting mechanism being divided in two portions, one of which is for handling the rods used at the rear face of the sheet and in the illustrated embodiment is located chiefly in the left wing of the apparatus (Fig. 1a), and the other of which is for handling the rods used at the front face of the sheet and is located chiefly in the right wing of the apparatus (Fig. 1b).

A suitable supporting frame, as shown, is provided for mounting the several mechanisms in their coordinated relationship. For convenience, the frame may be regarded as comprising three tiers. The rod-positioning mechanism is located at the upper tier of the frame, the rod extracting and returning mechanism is located generally between the intermediate and upper tiers of the frame, devices for feeding and discharging the looped material are located generally between the intermediate and lowermost tiers of the frame, and at the lower tier is located the main driving mechanism.

With regard first to the sheet-manipulating mechanism, the sheet A is guided from a suitable source behind the apparatus vertically downward into the upper central portion of the apparatus, and for this purpose a pair of laterally spaced brackets 11, 11 are mounted in overhanging relation to the top central portion of the frame, these brackets supporting between them a guiding apron 12 and suitable guide rollers 13, 13 over which the sheet A passes. For avoiding slack in the incoming sheet a tensioning roll 14 is mounted at the ends of spaced pivoted and counter-balanced arms 15, 15 and bears down against the upper surface of the sheet (Figs. 1a and 1b) with the proper light pressure, and for avoiding excessive tension in the sheet one of the arms 15, 15 may be associated with a switch 16 responsive to angular movement of the arm and having suitable electrical connections with the driving motor of the apparatus to cause the latter to be stopped before the sheet can become excessively taut.

Figure 6:
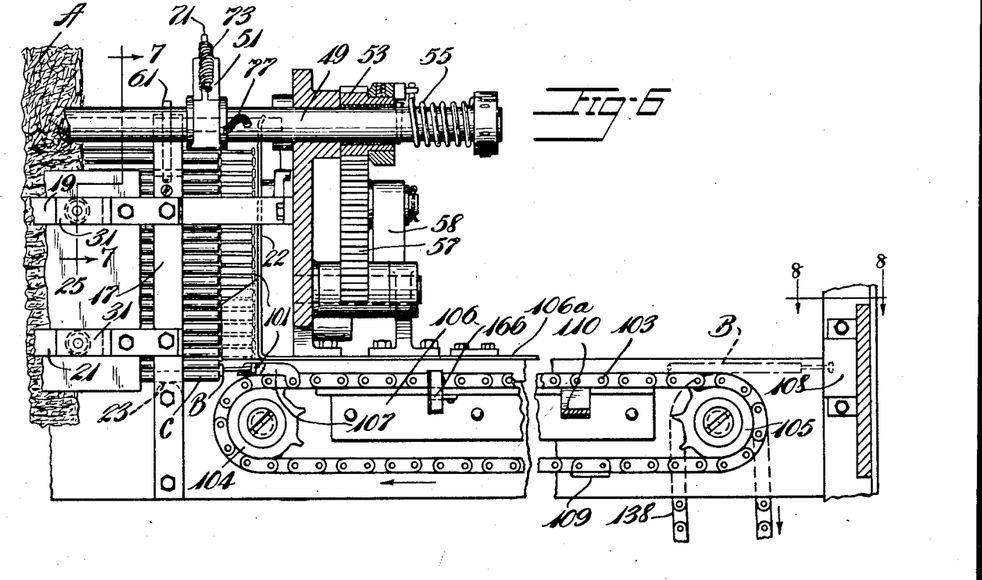
Fig. 6 is a section taken along the line 6—6 of Fig. 5.
Figures 7, 8:
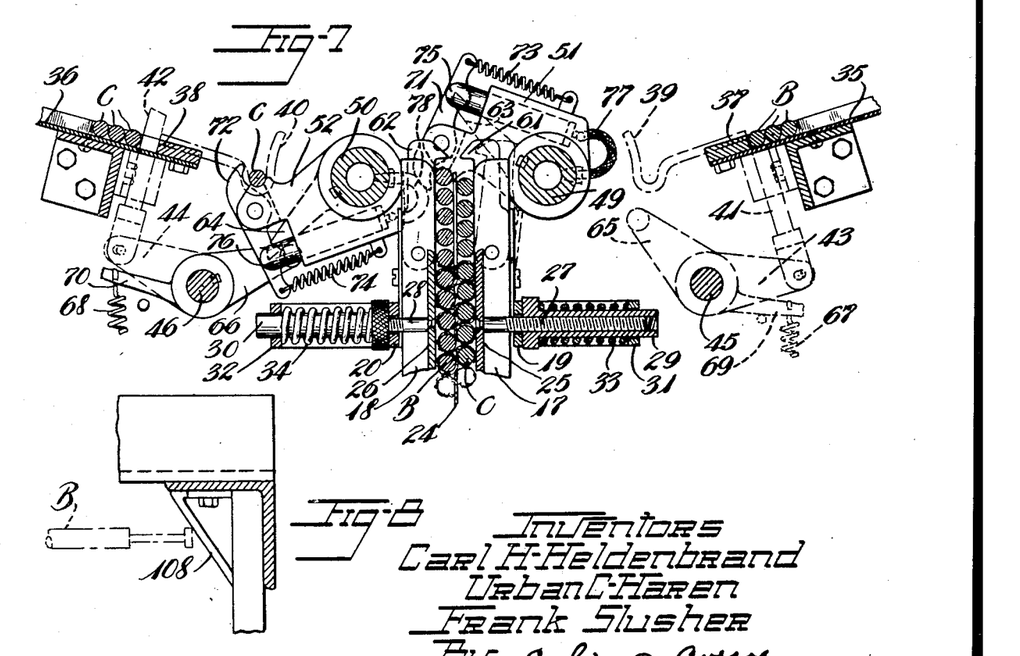
Fig. 7 is a section taken along the line 7—7 of Fig. 6, with a portion of the sheet material omitted for clarity of illustration of the apparatus.
Fig. 8 is an enlarged section taken along the line 8—8 of Fig. 6.

Centrally of the apparatus are disposed a front pair of vertical guide members 17, 17 and a rear pair 18, 18, which pairs are spaced apart from front to rear a sufficient distance to accommodate loosely between them two columns of loop-forming rods B, B and C, C in staggered relation (Fig. 7). The members of each pair are spaced apart cross-wise of the machine sufficiently to contact the rods without contacting the sheet material, the rods being considerably longer than the width of the sheet material (Figs. 1a, 1b and 6). These pairs of guide members are secured at their lower portions to the frame, and are braced at their upper portions by respective cross-members 19 and 20 extending between and beyond the members of each pair and secured thereto and to the frame. Also extending between the members of the front pair and secured to them at a somewhat lower position is a brace member 21 (Figs. 1a and 1b) and there is a corresponding brace (not shown) for the rear pair of guide members. The frame is provided with guides 22, 22 and 22a, 22a loosely aligning the ends of the rods of each column in such relation that at the left (Figs. 1a and 1b) the front rods project somewhat beyond the ends of the rear rods, and at the right the rear rods project somewhat beyond the front rods, to facilitate extraction of the rods.

The front column of rods C, C is limited to downward movement between the guides by seats 23, 23 on the guides 17, 17 (Figs. 1a, 1b and 6), and the rear column of rods B, B is likewise limited in descent by corresponding seats (not shown) on the guides 18, 18, the latter seats, however, being offset vertically from the seats 23, 23 to provide the staggered relation of the rods.

Between each pair of the opposed guides 17, 17 and 18, 18 is mounted a comparatively thin, vertical guide plate 24 (Figs. 4, 5 and 7) separating the two columns of rods to prevent their jamming and to maintain the vertical alignment of each column. These two guide plates 24 are spaced apart in the direction along the rods a sufficient distance so as not to interfere with the sheet material.

A front vertically disposed presser plate 25 and a similar rear plate 26 are positioned between the vertical guides to embrace transversely between them the columns of rods with the sheet material looped about the latter, the front plate 25 being resiliently mounted upon the adjacent transverse braces 19, 21 and the rear plate 26 being resiliently mounted upon the corresponding rear braces by means of a plurality of studs 27, 27 and 28, 28, projecting forwardly and rearwardly from the respective plates and being slidable in apertures in the braces. Threaded upon the studs are collared sleeves 29, 29 and 30, 30 and between the collars of the sleeves and respective brackets 31, 31 and 32, 32, which are secured to the transverse braces, are disposed compression springs 33, 33 and 34, 34 adapted to urge the studs and thereby the plates toward each other. The braces 19, 19 and 20, 20 limit the inward movement of the plates to facilitate the initial entry of the rods. By adjusting the position of the threaded sleeves upon the studs, the degree of pressure exerted by the plates against the embraced assembly of rods and sheet material may be regulated for most effective operation. The resilient pressure of these plates assists in preserving the vertical alignment of the rods by urging them against the central guide plates 24, 24 and consequently contributes to the uniformity of shape of the looped material, and by relieving the lowermost rods of a large part of the weight of the superimposed rods this construction facilitates the subsequent rod extracting operations.

At horizontally spaced positions to the front of and to the rear of the position at which the sheet A descends vertically into the loop-forming machine are mounted two trays 35 and 36 (Figs. 7 and 9), supporting a supply of the loop-forming rods B, B and C, C, respectively and sloping downward in an inward direction to cause the rods to roll toward the inner edges of the trays. A shoulder 37 on the tray 35 and a shoulder 38 on the tray 36 prevent the rods from unintendedly rolling off the trays. Pairs of spaced-apart rod receiving hooks 39, 39 and 40, 40 are mounted at the edges of the respective trays, and pairs of ejector studs 41, 41 and 42, 42 are mounted for vertical reciprocation through apertures in the respective trays for periodically raising the leading rod in each tray and causing the rod to be boosted over the shoulder of the tray so that it will roll onto the hooks. For reciprocating the ejector studs, arms 43, 43 and 44, 44 are pivoted to the lower ends of the studs, these arms being keyed to respective rock-shafts 45, 46 which are rotatably supported in the frame and have operating levers 47, 48 secured at an end of each.

Two rock-shafts 49 and 50 are mounted respectively between the front tray 35 and the central rod columns and between the latter and the rear trays 36, and these rock-shafts have attached thereto a plurality of rod-placing arms 51, 51 and 52, 52, respectively. Each of these rod-placing arms is formed with a concave rod seat near its outer end, and the arrangement is such that the arms are swung between a rod receiving position at the hooks 39, 39 and 40, 40 and a rod-setting position at the sheet material, the front and rear sets of rockers being moved in alternation to position alternately the rods B, B against the front face of the sheet material and distort the latter to the rear column of rods, and the rods C, C against the rear face of the sheet and distort it to the front column, whereby the sheet is caused to be looped sinuously about the rods (Fig. 7).

For imparting the oscillating motion to the rock-shafts 49 and 50, these shafts are provided at their right hand ends with respective pinions 53 and 54 which are rotatable on these shafts and have a driving connection therewith through respective torsion springs 55 and 56, the ends of which are secured to the shafts and to the pinions. A segmental gear 57, meshing with the two pinions, is pivotally mounted on the frame and is oscillated by means of a pitman 58 connecting the segmental gear with a crank arm 59 which is secured to a rotating shaft 60.

The torsion spring connections of the pinions 53, 54 to the rocker shafts permits the rocker arms to press the rods resiliently in place against the sheet material without injury to the sheet or jamming of the parts, and this resilient downward pressing of the rod and material assembly advances the assembly and presses the contacting wall portions of adjacent loops into adhesive engagement with each other.

At the upper ends of the vertical rod guides 17, 17 and 18, 18 are mounted respective spring pressed latches 61, 61 and 62, 62 which yield forwardly and rearwardly to permit entrance of the rods and then close over the placed rods to prevent upward return movement of them.

For operating the ejector studs 41, 41 and 42, 42, in timed relation with the rock-shafts 49 and 50, the latter are provided respectively with arms 63 and 64 adapted in the lowermost retracted position of the rod-placing arms to engage and rock respective arms 65 and 66 secured to the rock-shafts 45 and 46, the arrangement being such that each ejector stud is raised to cause a rod to roll onto the receiving hooks after the rod-placing arms of the adjacent rock-shaft have passed the hooks into positions beneath them so that on the return movement of each rod-placing arm the latter will pick up the rod from the hooks and swing it into the sheet looping position. The ejector studs are urged downward by means of respective tension springs 67 and 68 secured to the frame and to arms 69 and 70 secured to the shafts 45 and 46, respectively.

In order that the rods will be securely held on their seats on the rod-placing arms 51, 52 during the swinging movement, the end rod-placing arms of the two sets are provided with pivoted latch-jaws 71, 71 and 72, 72, respectively, which are urged resiliently to the open position of the jaws by respective springs 73, 73 and 74, 74. For periodically moving the latch-jaws to the rod-engaging positions, these and rod-placing arms of both sets are provided with fluid pressure cylinders in which are disposed pistons 75, 75 and 76, 76 which are in engagement with the pivoted jaws so as to impart to them a closing movement by the action of pressure fluid in the cylinders and to permit the jaws to be opened by the springs 73, 73 and 74, 74 upon release of the pressure fluid.

Figure 2:
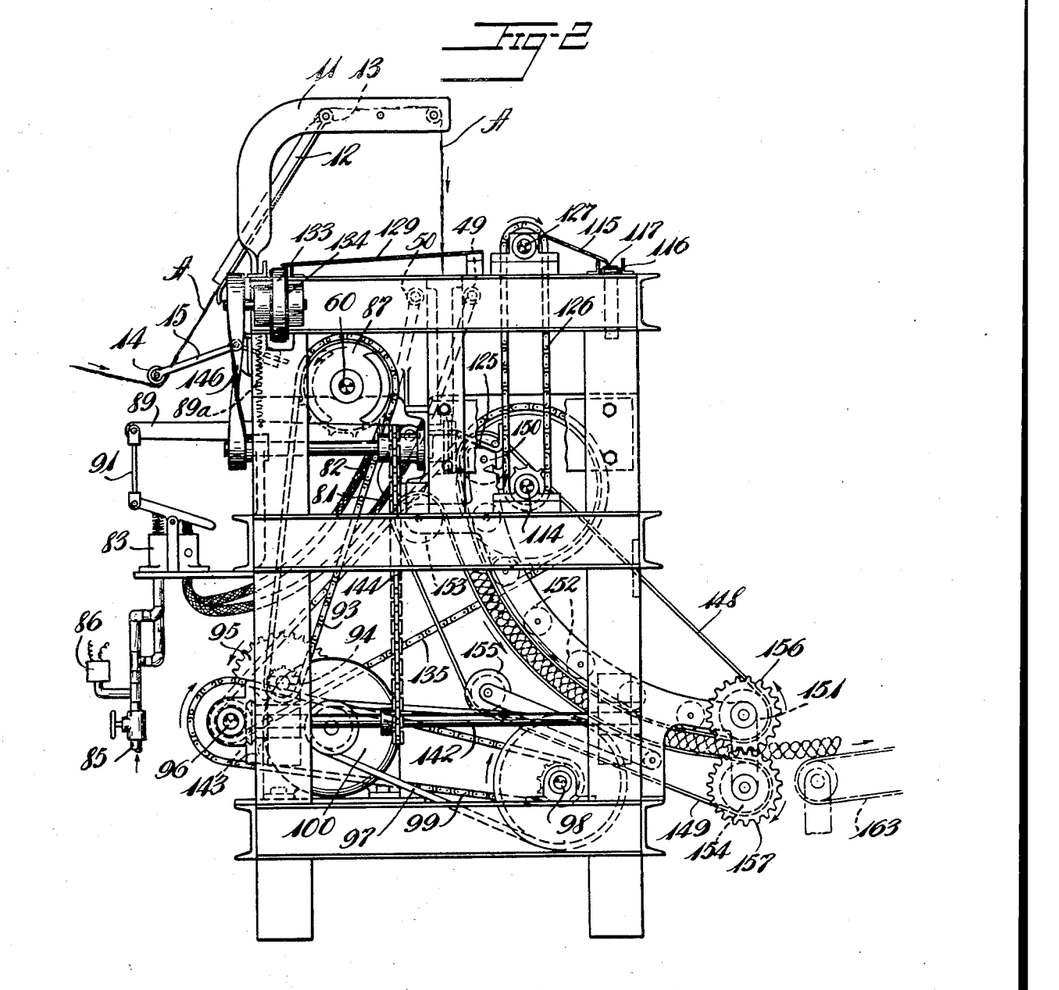

The pressure fluid is conducted to and from the cylinders of the respective sets of rod-placing arms through hose conduits 77 and 78 connecting the cylinders with the interiors of the shafts 49 and 50, which are hollow for this purpose. At their left hand ends the hollow rock-shafts are connected by means of respective flexible conduit couplings 79 and 80 with two conduits 81 and 82 which are connected with respective two-position valves 83 and 84, each of which is adapted in one of its positions to vent the connected conduit and in the other of its positions to admit pressure fluid to the conduit from a fluid supply line 85. A fluid-pressure operated switch 86 (Fig. 2) may be associated with the supply line with suitable electrical connections to the driving motor of the apparatus so that the latter will be automatically stopped upon an undesirable drop in the pressure of the fluid supply.

Figure 3:
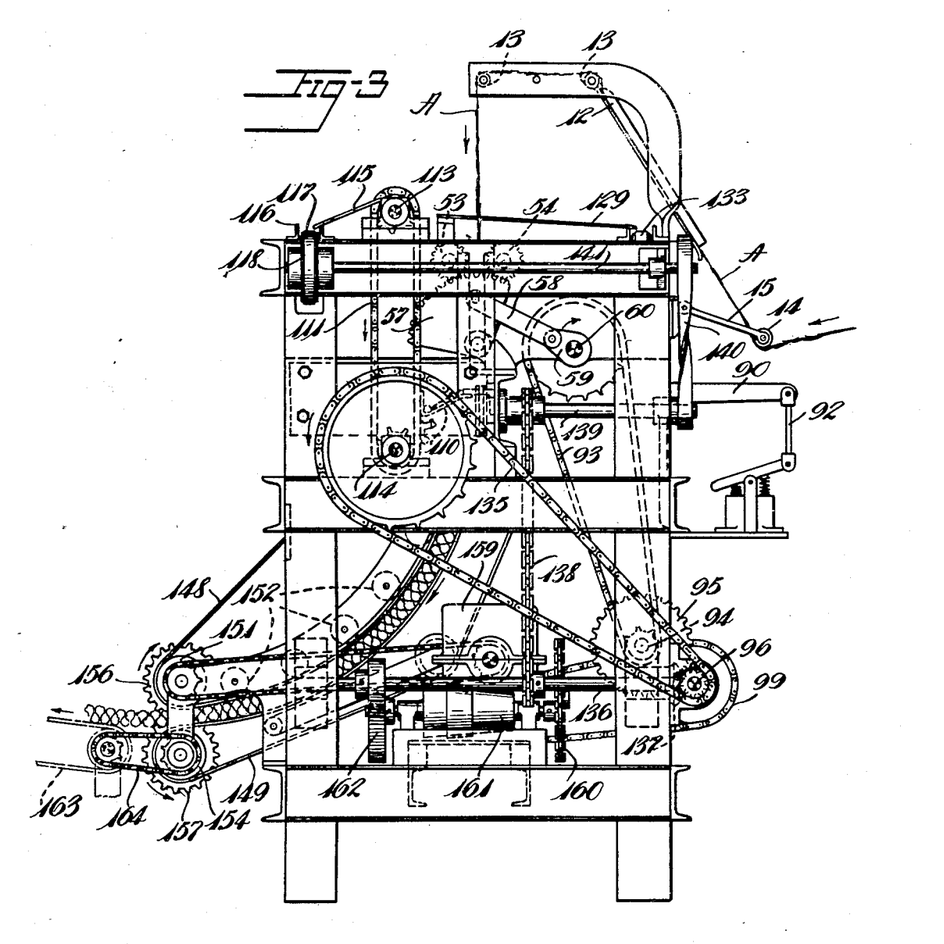
Fig. 3 is an end elevation of the apparatus as seen from the right in Fig. 1b.

The valves 83 and 84 are operated in timed relation with the rock-shafts 49 and 50 so that the jaws 71, 71 and 72, 72 will be opened and closed at the proper times, and for this purpose the rotating shaft 60, by which the rock-shafts are oscillated, is provided at its left hand end with a cam wheel 87 (Figs. 1a, 2 and 4) which has cams 87a and 87b on its two faces. Pivoted to the frame on a horizontal axis at 88 are two rearwardly extending levers 89 and 90 which are urged upwardly by respective tensions springs, one of which is shown at 89a, and these levers engage respectively the cams 87a and 87b. The rear ends of these levers are operatively connected with the valves 83 and 84, respectively, by means of pivoted links 91 and 92 (Figs. 2 and 3), and the arrangement is such that as the shaft 60 rotates, the arms 89 and 90, and accordingly the valves 83 and 84, are cam operated to admit and vent pressure fluid behind the pistons 75, 75 and 76, 76, of the latch-jaws periodically and alternately with respect to the front and rear sets of jaws, so that each jaw is caused to grip a rod at the time the latter is picked up by the arm and to hold the rod until it is swung to its sheet-looping position where the jaw is caused to release the rod.

The shaft 60, by which the rock-shafts are oscillated and the fluid pressure valves are operated, is itself rotated by means of a sprocket chain connection 93 from a shaft 94 (Figs. 1a, 2 and 3) which has a gear 95 (Figs. 1a, 2 and 3) meshing with a pinion on a main drive shaft 96 that extends entirely across the apparatus. The main drive shaft 96 is driven through a belt drive 97, a shaft 98, and a sprocket chain connection 99, all in train, from a motor 100.

Mechanism for extracting the lowermost rods from the looped sheet material, and mechanism for returning the extracted rods to the trays 35 and 36, all in timed relation with the above described rod-positioning mechanism, is illustrated in Figs. 1 to 6.

As before explained, the lowermost rod (C) in the front column comes to rest on the seats 23, 23 of the vertical guides 17, 17 and the lowermost rod (B) of the rear column comes to rest upon the corresponding seats on the vertical guides 18, 18. Each of the rods B is formed at its right hand end with an annular shoulder 101 and each of the rods C is formed at its left hand end with a similar shoulder 102.

The mechanism for extracting the rods B, B, located in the right wing of the apparatus, comprises an extractor chain 103 mounted on sprockets 104 and 105 for movement of its upper reach upon a supporting plate 106 in a course which is in approximate alignment with the lowermost rod (B) of the column. A claw 107, pivoted to the chain, is adapted to engage the shouldered portion 101 of the rod at the beginning of the upper reach of the chain and by the travel of the latter to extract the rod lengthwise of itself from the looped material, the rod being carried upon the chain preferably close beneath an overlying guiding portion 106a of the frame which prevents objectionable upward movement of any part of the rod and keeps the rod engaged with the claw.

The extractor chain is of such length that the rod is completely extracted by the time the claw 107 reaches the sprocket 105, and as the claw passes downward in its course around the latter sprocket it disengages the rod, which, by its momentum, is thrust end on against a deflector 108 (Figs. 1b and 8) on the frame and is dislodged from the chain in a forward direction with respect to the apparatus. In order that the rear end of the rod will be dislodged from the chain substantially at the same time as the forward end, the chain is provided with a dislodging cam 109 (Figs. 1a, 5 and 6) comprising a sloping surface that is so shaped and located as to crowd the read end of the rod off the moving chain also in a forward direction with respect to the apparatus. For preventing undesirable rebound of the rod in a direction to the left, the frame is provided with a forwardly projecting abutment 166.

In a position to catch the dislodged rod is mounted a pair of rod-supporting brackets 110, 110, and in the proper relation thereto is mounted a pair of endless rod-lifting chains 111, 111 each having one or more hooks 112, 112 adapted when in the rising reach of the moving chain to pick up a rod lying upon the brackets 110, 110 and carry it upwardly. Preferably, each chain is provided with two such hooks, as shown, which permits operation of the chain at a slower speed. These rod-lifting chains are mounted upon sprockets secured to shafts 113, 114 which extend transversely of the apparatus, the upper shaft being located sufficiently high in the apparatus so that the rod will be lifted to a height somewhat above that of the tray 35, hereinbefore described, but of course to the right thereof. At the downward curvature of the chains 111, 111 over the upper sprockets the rod is permitted to drop from the hooks 112, 112, and for catching the dropped rod there is provided a chute 115 down which the rod is permitted to roll toward the front of the apparatus.

At the bottom of the chute 115 is provided a rod-receiving channel 116 extending across the right wing and central portion of the apparatus at the front, and in this channel is disposed the upper reach of an endless conveyor belt 117, the latter having end pulleys 118, 118 mounted in the frame. A curved deflector plate 119 (Fig. 9) is mounted at the left hand side of the tray 35 in such relation to the belt 117 as to deflect the rod carried upon the latter into the tray where it awaits its turn for another cycle of operation.

In the left wing of the apparatus is disposed mechanism for extracting and returning the rods C, C, this mechanism being generally similar to but differing in certain respects from the rod-extracting and returning mechanism of the right wing.

An extractor chain 120 having a catch member 121 engageable with the shoulder 102 of the end of the rod and a cam element 122 (Figs. 1a and 4), is arranged for extraction and dislodging therefrom of the lowermost rod (C) in a manner similar to that of the corresponding parts in the right wing, except that the extracting movement is in the opposite direction, and there is likewise provided a supporting plate 123 for the upper reach of the chain, an upper guide 123a, a rod-dislodging baffle 124, and a pair of brackets 125, 125 for catching the dislodged rod, as well as an abutment 167 for preventing objectionable rebounding travel of the rod, in this case to the right.

Also as in the right wing mechanism there is provided a pair of endless rod-lifting chains 126, 126, these being mounted on sprockets on an upper shaft 127 and on an extension of the shaft 114 which extends across the entire apparatus. Each of the chains is provided with one or more rod-carrying hooks 128, preferably two as shown, (Fig. 4), and for the purpose of discharging the rods carried thereby onto a rearwardly extending chute 129, rather than toward the front of the apparatus as in the right wing mechanism, each of the hooks is provided with a loosely pivoted trigger member which comprises a downwardly extending weighted portion 130 and a rearwardly extending finger 131. The arrangement is such that the hooks of the rising reaches of the pair of chains pick up a rod lying upon the brackets 125 and carry the rod upward to the chute 129 where the triggers are caused to be turned about their pivots by engagement of their fingers with the margin of the chute to discharge the rod onto the chute, the weighted lower portions of the triggers then causing them to assume their normal attitudes. At the rear or bottom edge of the chute 129 is provided a channel 132 extending along the rear of the apparatus to a position beyond the far end of the tray 36, and within the channel is disposed the upper reach of an endless conveyor belt 133 mounted upon end pulleys 134, 134. At the far end of the tray 36 is provided a deflecting guide (not shown) similar to the guide 119 of tray 35, but of course reversed in curvature, for deflecting onto the tray the rods conveyed by the belt 133 from the chute 129. The rods thus returned to the tray 36 are then ready for another cycle of operation.

The rod-lifting chains 111, 111 and 126, 126 are driven together by means of a sprocket chain connection 135 from the shaft 114 to the main drive shaft 96, and as the shaft 114 extends entirely across the apparatus the lifting chains 126, 126 of the left wing are also driven by this connection.

At the right hand end of the apparatus is provided a fore and aft drive shaft 136 having a bevel gear connection with the main drive shaft at 137, and from the shaft 136 through a sprocket chain connection 138 is driven a shaft 139 to which is secured the sprocket 105 of the extractor chain 103 for driving the latter. The shaft 139 also has a driving connection through a belt 140 with a shaft 141 which is secured to pulley 118 of the conveyor belt 117, so that all these parts are driven together.

At the left hand end of the apparatus is mounted a fore and aft drive shaft 142 (Figs. 1a and 2) having a bevel gear connection 143 with the main drive shaft 96, and from the shaft 142 through a sprocket chain connection 144 is driven a shaft 145 to which is secured the end sprocket of the extractor chain 120 for driving the latter. The shaft 145 also has a driving connection through a belt 146 a shaft 147 which is secured to and drives the end pulley 134 of the conveyor belt 133.

For conveying the looped sheet material from the position at which the rods are extracted, there is provided an upper series of narrow and spaced apart conveyor belts 148, 148 and a lower series of belts 149, 149 the upper belts passing over an upper end roller 150, a lower end roller 151 and at its lower reach over a curved series of idler rollers 152, 152, and the lower belts 149, 149 passing over an upper end roller 153, a lower end roller 154 and tensioning roller 155, to embrace the looped sheet material yieldingly at the inner reaches of the two sets of belts and convey it downwardly and forwardly in an arcuate path to discharge it at the lower front portion of the apparatus. The tensioning roller 155 preferably is provided with peripheral ridges between belts to guide the latter, and for similarly guiding the upper series of belts a comb-like guide structure 165 is mounted on the frame with its teeth projecting between the belts.

The lower rollers 151 and 154 of the two sets of belts are interconnected for rotation together by meshing gears 156 and 157 secured to their shafts, respectively, and for causing the lower set of belts to move at a speed sufficiently greater than that of the upper set to avoid objectionable restraint or slippage of the material by the lower belts despite the greater distance in the arcuate path that a point on a lower belt must travel, as compared with a point on an upper belt, the lower gear 157 is provided with a lesser number of teeth than the upper gear 156.

The roll 151, and accordingly all the feeding belts, are driven by a sprocket chain connection 158, a reduction gear unit 159, a sprocket chain connector 160, a variable speed device 161 and a belt connection 162, all driven in train, from the fore and aft drive shaft 136, hereinbefore described.

For conveying the looped sheet material away from the apparatus, a conveyor 163 may be provided and this may be driven from the roller 154 of the feeding belts by a sprocket chain connection 164.

Figure 4:
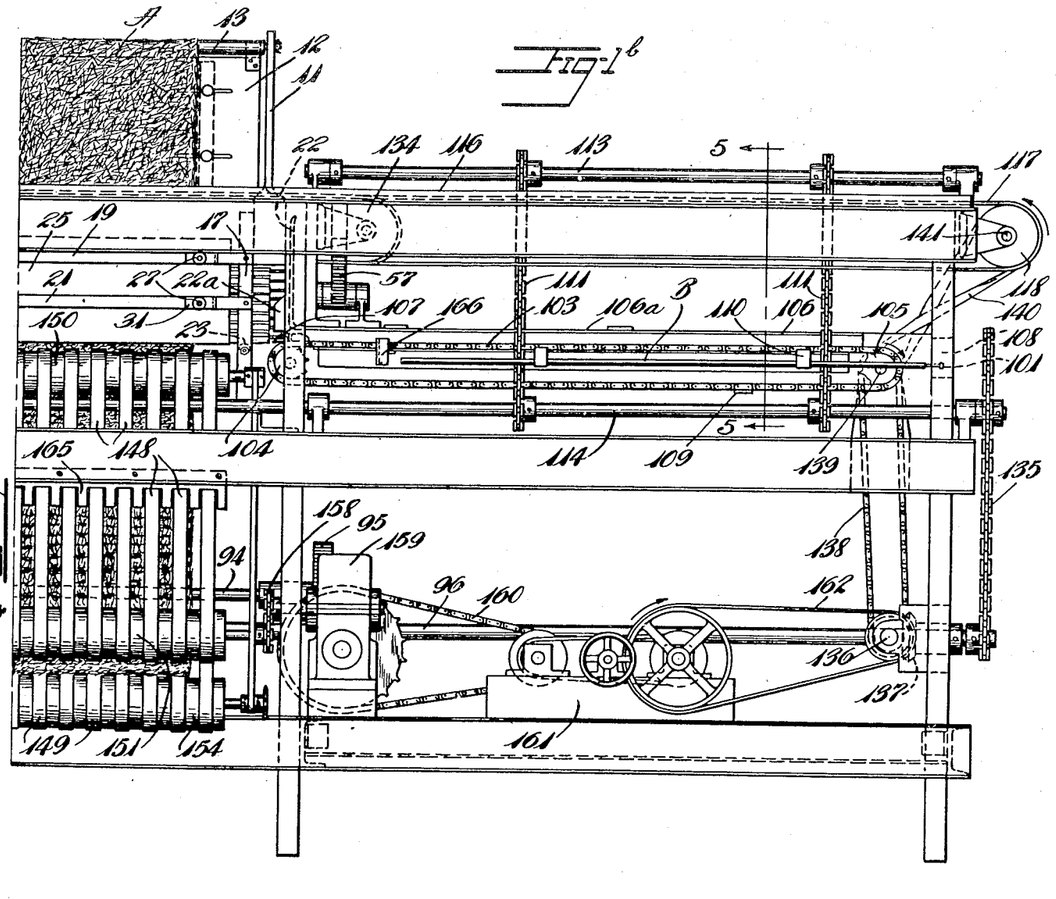
Figure 5:
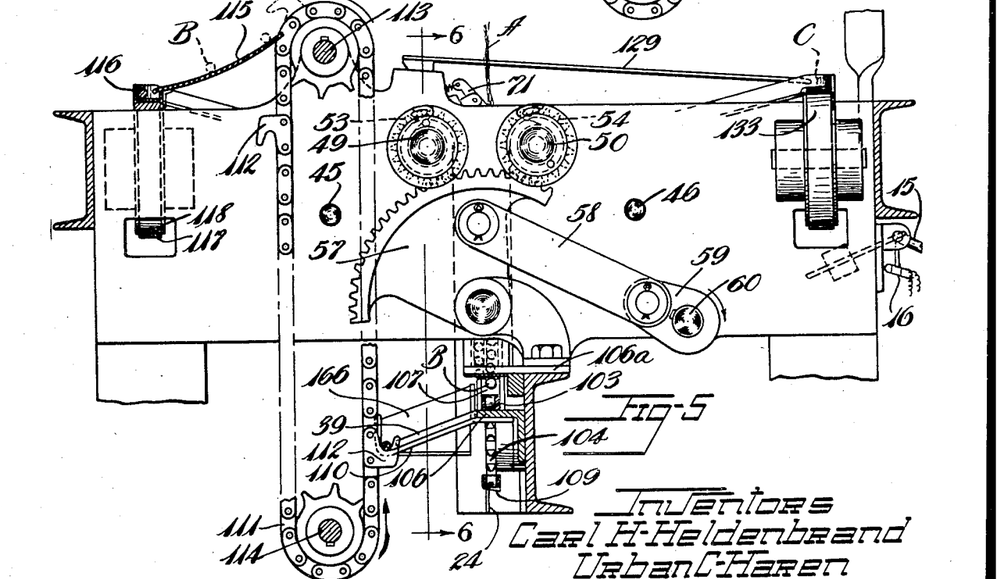
Fig. 5 is an enlarged section taken along the line 5—5 of Fig. 1b.
Figures 9, 10:
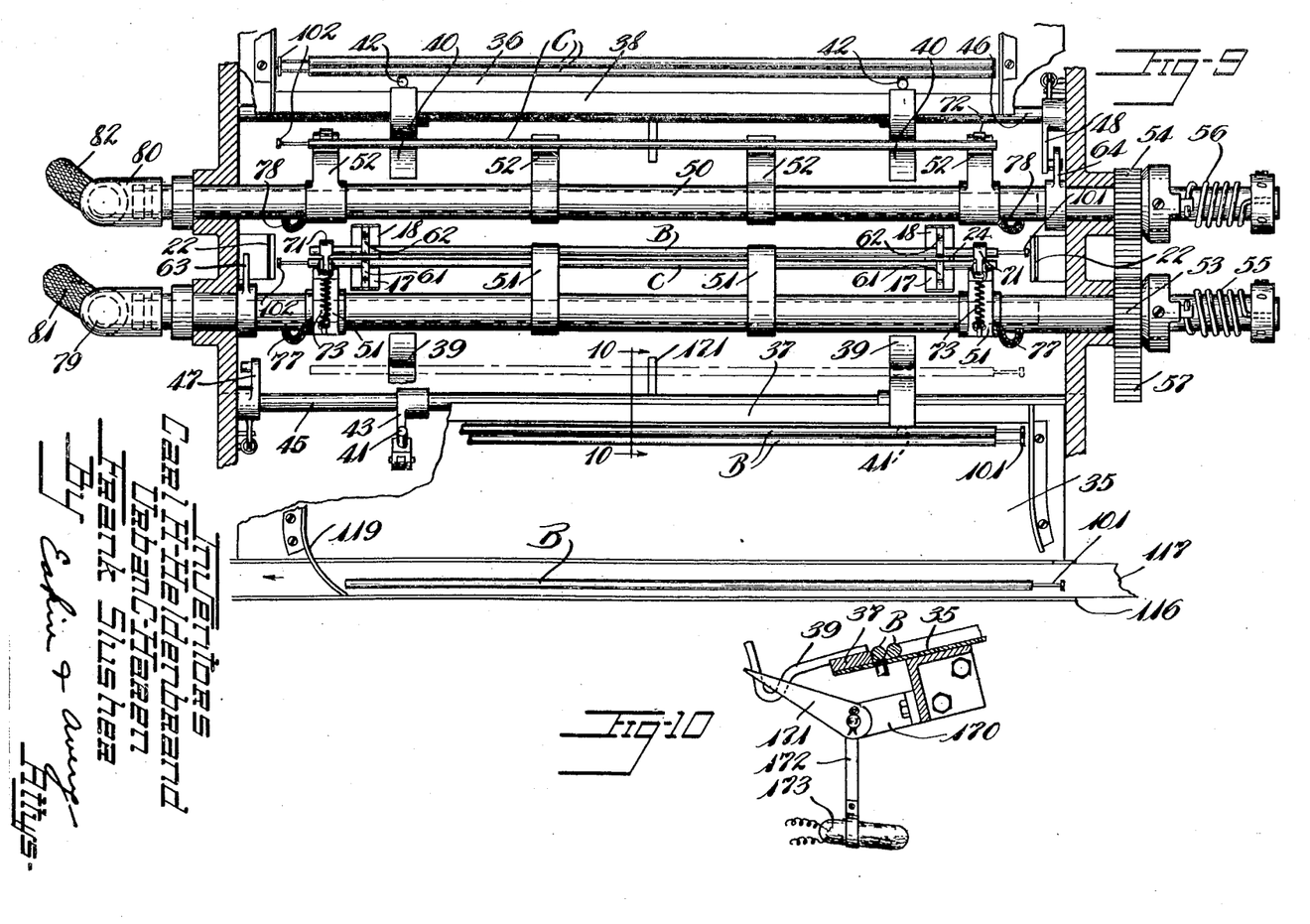
Fig. 9 is a plan view of the central portion of the apparatus, parts being sectioned and broken away, and for clarity of illustration of the apparatus, no sheet material being shown.
Fig. 10 is a view taken along the line 10—10 of Fig. 9.

Referring to Figs. 4, 9 and 10, safety devices are preferably provided for causing the apparatus to stop upon failure of the feed of a rod from the tray 35 onto the receiving hooks 39, 39 to permit the operator to rectify the operation. Beneath the tray 35 at its lower edge is mounted a bracket 170 upon which is pivoted an arm 171 extending into a position to be depressed by a rod lying upon the hooks. The arm 171 is provided with a downward extension 172 serving as a weight to urge the arm 171 to its upper position and having mounted thereon a mercury switch 173 arranged to open an electrical connection, when the arm 171 is in its upper position and to close the electrical connection upon depression of the arm 171 by the arrival of a rod upon the hooks. In order that the apparatus will not be stopped each time a rod is lifted from the hooks 39, 39, during normal operation, a second switch 174 (Fig. 4) is provided, this latter switch being operated by a suitable cam 175 mounted upon the rotating shaft 60. These switches are suitably connected electrically to the main driving motor in a manner which will be understood by those skilled in the art, and the arrangement is such that the circuit is fully opened by these switches to stop the apparatus only upon the failure of a rod to be deposited upon the hooks at the proper time. Similar safety devices (not shown) may be provided in association with the receiving hooks of the other tray, and also of the rod receiving brackets of the extracting mechanism, if desired.

In operation, the moving parts of the entire apparatus are driven by the motor 100 through the interconnected driving mechanism above described, so that all the operations are performed in timed relation. The sheet material A, which may be of unwoven fibers held in reticulated sheet form by a flexible agglutinant, preferably rubber composition in an unvulcanized, tacky condition, is drawn under the tensioning roller 14, over the guide plate 12, over the idler guide roller 13, 13 and then vertically downward into the central portion of the apparatus in the space between the two front vertical guides 17, 17 and the two rear vertical guides 18, 18.

By means of the two sets of rod-placing arms 51, 51 and 52, 52, respectively of the shafts 49, 50, which are oscillated by means of the driven sector gear 57 meshing with the respective shaft pinions 53, 54, the rods B, B, are one at a time picked up by the front arms from the front hooks 39, 39 and swung over into engagement with the front face of the sheet material, where each of these rods is deposited in the rear vertical column of the rods, and in alternation therewith the rods C, C, are picked up from the rear hooks 40, 40 and swung by the rear arms 52, 52 into engagement with the rear face of the sheet into the front vertical column, the sheet material by these operations being looped sinuously about the rods. Each rod is pressed into position resiliently by virtue of the torsion spring connection 55, 56 between the respective pinions 53, 54 and the rocker shafts, and the rod and material assembly is thus downwardly advanced.

The rods B, B are deposited one at a time upon the front hooks 39, 39 when the front arms swing below these hooks so that on each upward return movement of the arms a rod will be picked up, thus depositing of the rods upon the hooks being effected by means of the ejector studs 41, 41 which are vertically raised through their apertures in the tray 35 at the proper time to boost a rod over the shoulder 37 of the tray by means of the ejector operating shaft 45 which is partially rotated by the depression of its arm 47 by the arm 63 of the rocker shaft 49. These ejector studs are lowered, to permit the next rod of the tray to roll to a position against the shoulder 37 at the picking up of the rod, by the release of the arm 47 of the ejector shaft 45 and by means of the tension spring 67 urging the ejectors downward.

The rods C, C are one at a time boosted over the shoulder 38 of the rear tray by means of ejector studs 42, 42, which are raised to effect this by the engagement of the arm 64 of the rear rock-shaft with the arm 48 of the ejector operating shaft, and which are urged to their lower positions by tension spring 68, to deposit the rod upon the rear hooks 40, 40 at the proper time so that the rod will be picked up by the rear rocker arms, all in a manner similar to that of the above described front rod-manipulating mechanism, but in alternation therewith.

At the time each rod is picked up by the rod-placing arms it is gripped and held against the end most rocker arms by means of the jaws 71, 71 of the front rocker arms and 72, 72 of the rear arms, which jaws are pivoted to the arms and are urged to the rod gripping position against the force of their retracting springs 73, 73 and 74, 74 by means of the fluid-pressure operated pistons 75, 75 and 76, 76 in the arms, these jaws holding the rod against the arms until the latter have swung the rod into its sheet looping position where the jaws are caused to release the rod for the retracting swing of the rocker arms.

The pressure-fluid is conducted to and vented from the piston cylinders at the proper times by means of the valves 83, 84 controlling the fluid flow to the cylinders from the fluid supply main 85 through the conduits 81, 82, through the flexible couplings 79, 80, through the interiors of the hollow rocker shafts and through the conduits 77, 77 and 78, 78, the latter connecting the hollow shafts with the piston cylinders. These valves 83 and 84 are operated in the proper timed relation by means of the pivoted valve operating arms 89 and 90 which are spring urged upwardly and are periodically depressed by the respective rotary cams 87a and 87b mounted upon the left hand end of the driven shaft 60, which shaft at its right hand end operates the rocker-oscillating sector gear 57 through the crank arm 59 and pitman 58.

Between the consecutive rod positioning operations at the top of the two rod columns the lowermost rods of the columns are extracted, the rod columns accordingly being lowered by the intermittent pressure of the rod-placing arms and the looped sheet material being correspondingly advanced at each of the successive operations. The rods are guided in their downward movement by the four vertical guides 17, 17 and 18, 18, the end guides 22, 22 and 22a, 22a and the central guide plates 24, 24, and the staggered relation of the rods is maintained by virtue of the fact the seats 23, 23 in the guides 17, 17 for the lowermost rod of the front column are offset in a vertical direction with respect to the corresponding seats in the rear guides 18, 18 for the rear column of rods.

The front and rear plates 25 and 26, which are resiliently urged toward each other against the rod columns and looped sheet assembly by means of the compression springs 33, 33 and 34, 34 associated with their mountings, serve to maintain the rods in vertical alignment in the columns, and to resist yieldingly the descent of the rods, so that sufficient pressure is set up by the downward pressing of each rod to press the loop walls of the material into adhesive engagement, and also so that at the rod extracting operation the lowermost rods will be relieved of a considerable part of the weight of the rods above them to lessen the frictional resistance to extraction of these rods.

At the times when no rod is being pressed down from above the lowermost rod of the rear column is extracted toward the right and simultaneously therewith the lowermost rod of the front column is extracted to the left, this opposition of the pulling movements facilitating the extraction without objectionable lateral movement of the tacky material to one side or the other due to friction, and without injury to the material. The lowermost rods B and C of the two columns are extracted by engagement of the claws 107 and 121 of the extractor chains 103 and 120 with the shoulders 101 and 102 of the respective rod ends, the claws being moved into engagement with the rod shoulders on rounding the peripheries of the inside end sprockets of the chains to draw the rods out onto the upper reaches of the chains and beneath the guide plates 106a and 126a, respectively. On curving around the outside end pulleys of the chains the claws release the rods which then strike end on against the deflectors 108 and 124 respectively, and are caused to be dislodged forwardly from the chains.

Objectionable rebound of the rods toward the center of the apparatus is prevented by the abutments 166 and 167, respectively. The cam members 109 and 122 on the respective chains assure dislodgement of the rear ends of the rods. The dislodged rods fall upon the respective pairs of receiving brackets 110, 110 and 125, 125 in positions to be picked up by hooks on the respective pairs of lifting chains 111, 111 and 126, 126.

The rods B, B in the right wing of the apparatus are lifted by the hooks 112, 112 of their lifting chains, and are carried up over the upper end sprockets of these chains where the rods are dumped upon the chute 115. The rods then roll down upon the moving conveyor belt 117 in the guide channel 116 which carries them back to the tray 35 upon which the rods are diverted by means of the curved deflector 119, in a position to be put through the next cycle of operation.

The rods C, C in the left wing of the apparatus are lifted from the brackets 125, 125 by the hooks 128, 128 of the lifting chains 126, 126 and near the end of the rising reaches of these chains the rods are crowded rearwardly off the hooks onto the chute 129 by the engagement with the edges of the chute of the fingers 131, 131 of the dislodging triggers associated with the hooks. The rods then roll down the chute to the rear of the apparatus and fall upon the conveyor belt 133 of the channel guide 132 which carries them back to the tray 36 upon which they are deflected for the next cycle of operation by the curved deflecting guide of that tray.

The looped material with its walls pressed into adhesion with one another is fed from the looping position by the upper and lower series of belts 148 and 149, respectively, which contact the looped sheet at its two faces, and, by their light embracing pressure, cause sufficient pressure of the cell walls against each other so that their adhesion will not be broken. The somewhat faster speed of the lower series of belts with relation to the speed of the upper belts permits the looped material to be conveyed through the arcuate path shown without undesirable distortion of the material due to the flexure.

The looped material is fed from the lower front portion of the apparatus, and is conveyed away for further operation such as drying, cutting, assembly into cushioning units, and vulcanization, by the conveyor 163 or other suitable means.

Variations may be resorted to without departing from the scope of the invention as it is defined in the following claims.

We claim:

1. Apparatus for sinuously looping sheet material comprising a plurality of sheet-looping elements, means for moving said elements in contact with the sheet material to effect the looping of the latter, and associated means for causing portions of the walls of adjacent loops to be pressed into contact with each other.

2. Apparatus for sinuously looping sheet material comprising a plurality of rods positionable in sheet-looping contact with the material, each rod having a shouldered end portion and means for extracting said rods while leaving the material sinuously looped, said means comprising an endless chain having a claw engageable with the shoulder of each rod.

3. Apparatus for sinuously looping sheet material comprising a plurality of sheet-looping elements positionable with the material looped sinuously about them and with portions of the walls of adjacent loops in contact, and means for extracting the elements while leaving the material sinuously looped and with the said portions of the loop walls in contact.

4. Apparatus for looping sheet material sinuously by progression along the sheet comprising means for manipulating the material to the looped form, means for effecting contact of portions of the walls of adjacent loops, and means for advancing the material.

5. Apparatus for looping tacky sheet material sinuously by progression along the sheet, said apparatus comprising a plurality of sheet-looping elements, means for moving the elements into their sheet-looping positions and for pressing the walls of adjacent loops into adhesive engagement, means for extracting the elements, and means for advancing the material.

6. Apparatus for looping sheet material sinuously comprising a plurality of sheet-looping rods, means for positioning the rods in sheet-looping contact with the material so that the latter encloses the circumference of each rod, and supporting means for the rod and material assembly permitting extraction of the rods from the looped material.

7. Apparatus for looping sheet material sinuously comprising a plurality of sheet-looping rods positionable in sheet-looping contact with the material, and means for extracting the so-positioned rods axially from the looped material.

8. Apparatus as defined in claim 6 in which the extracting means comprises means for drawing a pair of the rods simultaneously in opposite axial directions from the looped material.

9. Apparatus for looping tacky sheet material sinuously comprising a plurality of sheet-looping rods, and means for positioning the rods in contact with the opposite faces of the sheet material to loop it sinuously about the rods with walls of adjacent loops in contact, and means associated therewith for causing portions of adjacent loop walls to be pressed together into adhesive engagement.

10. Apparatus for looping sheet material sinuously comprising a plurality of sheet-looping rods, and means comprising a rod-transferring structure mounted for swinging movement to position the rods consecutively in their sheet-looping positions.

11. Apparatus as defined in claim 10 in which the rod-transferring structure comprises means for releasably clamping a rod to it.

12. Apparatus as defined in claim 10 comprising a rod support, and means for causing the rods to be deposited one at a time from said support upon the rod-transferring structure.

13. Apparatus for looping sheet material sinuously comprising a pair of spaced-apart rocker structures, a plurality of sheet-looping rods positionable on the respective structures, and means for rocking said structures in alternation to and from an intermediate sheet-looping position to position the rods in engagement with the two faces of the sheet.

14. Apparatus for looping sheet material sinuously comprising a plurality of sheet-looping rods, means for supporting a vertical row of the rods positioned in side to side relation with the sheet material looped sinuously about them, the arrangement being such that the weight of the rods at the upper part of the row is available to press together the rods and material at the lower part of the row and means for so positioning the rods.

15. Apparatus as defined in claim 14 in which the rod-positioning means is adapted to advance the rod and material assembly in the vertical direction upon the positioning of each rod.

16. Apparatus as defined in claim 14 in which the rod-positioning means is adapted to advance the rod and material assembly downwardly upon the positioning of each rod, and said apparatus comprises an abutment for limiting the advance of said assembly.

17. Apparatus as defined in claim 14 in which the rod-positioning means is adapted to advance the rod and material assembly downwardly upon the positioning of each rod, and said apparatus comprises an abutment for limiting the advance of said assembly, and means for extracting the rods at the abutment.

18. Apparatus for looping sheet material sinuously comprising a plurality of sheet-looping rods, means for supporting a row of the rods positioned in side to side and staggered relation with the sheet material looped sinuously about them, means for so positioning the rods, and means for extracting the rods leaving the material sinuously looped.

19. Apparatus for looping sheet material sinuously comprising a plurality of sheet-looping rods, a pair of spaced apart rod-supporting structures, means disposed intermediate said structures for supporting a row of the rods positioned in side to side relation with the sheet material looped sinuously about them, and means for transferring the rods from said structures into the said sheet-looping positions and for advancing the rod and material assembly.

20. Apparatus as defined in claim 19 comprising means for extracting pairs of the rods in opposite directions from the rod and material assembly in timed relation with the rod-positioning and advancing means, and means for returning the extracted rods to the rod-supporting structures.

21. Apparatus for looping sheet material sinuously comprising a plurality of sheet-looping rods, means for supporting a row of the rods positioned in side to side relation with the sheet material looped sinuously about them, and means for so positioning the rods and for advancing the rod and material assembly upon the positioning of each rod, said supporting means comprising means for resiliently resisting the advance of the rod and material assembly.

22. Apparatus for looping sheet material sinuously comprising a plurality of sheet-looping rods, means for supporting a row of the rods positioned in side to side relation with the sheet material looped sinuously about them, and means for so positioning the rods and for advancing the rod and material assembly upon the positioning of each rod, said supporting means comprising a pair of plates held resiliently pressed against the two faces of the rod and material assembly for resiliently resisting the advance of the latter.

23. Apparatus for looping sheet material sinuously comprising a plurality of sheet-looping rods, means for positioning the rods in contact with the sheet material to loop it sinuously about the rods with walls of adjacent loops in contact and for advancing the rod and material assembly, and means for resisting the advance of the assembly to effect pressing of portions of adjacent loop walls against each other.

24. Apparatus for sinuously looping sheet material comprising a plurality of sheet-looping elements and means for moving said elements in contact with the sheet material to manipulate the latter into loops completely closed circumferentially.

25. Apparatus for sinuously looping sheet material comprising sheet-looping means and means for manipulating the looped material into a form in which the loops are completely closed circumferentially.

CARL H. HELDENBRAND.
URBAN C. HAREN.
FRANK SLUSHER.